United States Patent [19]

Taylor

[11] Patent Number: 5,206,822
[45] Date of Patent: Apr. 27, 1993

[54] METHOD AND APPARATUS FOR OPTIMIZED PROCESSING OF SPARSE MATRICES

[75] Inventor: Valerie E. Taylor, Evanston, Ill.

[73] Assignee: Regents of the University of California, Oakland, Calif.

[21] Appl. No.: 792,907

[22] Filed: Nov. 15, 1991

[51] Int. Cl.$^5$ ............................................. G06F 7/38
[52] U.S. Cl. .................................. 364/736; 364/754; 364/748
[58] Field of Search ............... 364/736, 754, 730, 748, 364/732

[56] References Cited

U.S. PATENT DOCUMENTS

| | | | |
|---|---|---|---|
| 4,150,434 | 4/1979 | Shibayama et al. | 364/736 X |
| 4,698,751 | 10/1987 | Parvin | 364/754 X |
| 4,719,588 | 1/1988 | Tatemichi et al. | 364/754 |
| 4,787,057 | 11/1988 | Hammond | 364/754 |
| 4,914,615 | 4/1990 | Karmarkar et al. | 364/754 |
| 4,937,776 | 6/1990 | Myers et al. | 364/736 |
| 4,945,506 | 7/1990 | Baji et al. | 364/736 |
| 5,025,407 | 6/1991 | Gulley et al. | 364/754 |
| 5,038,312 | 8/1991 | Kojima et al. | 364/736 |

Primary Examiner—Tan V. Mai
Attorney, Agent, or Firm—Flehr, Hohbach, Test, Albritton & Herbert

[57] ABSTRACT

A computer architecture for processing a sparse matrix is disclosed. The apparatus stores a value-row vector corresponding to nonzero values of a sparse matrix. Each of the nonzero values is located at a defined row and column position in the matrix. The value-row vector includes a first vector including nonzero values and delimiting characters indicating a transition from one column to another. The value-row vector also includes a second vector which defines row position values in the matrix corresponding to the nonzero values in the first vector and column position values in the matrix corresponding to the column position of the nonzero values in the first vector. The architecture also includes a circuit for detecting a special character within the value-row vector. Matrix-vector multiplication is executed on the value-row vector. This multiplication is performed by multiplying an index value of the first vector value by a column value from a second matrix to form a matrix-vector product which is added to a previous matrix-vector product.

19 Claims, 7 Drawing Sheets

METHOD AND APPARATUS FOR OPTIMIZED PROCESSING OF SPARSE MATRICES

BRIEF DESCRIPTION OF THE INVENTION

This invention relates generally to computer architectures for processing computationally-intensive linear equations. More particularly, this invention relates to optimized storing and processing of sparse matrices for finite-element applications.

BACKGROUND OF THE INVENTION

The finite element method (FEM) is a general and powerful technique for solving partial differential equations. This technique is used in numerous engineering fields such as structural mechanics to model the stress and strain relationships for a given structure under an applied force, biomedical engineering to model bone deformations due to forces placed on joints resulting from such activities as running, and electrical engineering to model electromagnetic field problems or to measure the capacitance from geometric integrated circuit layout data.

The computationally-intensive step of this technique is the solution of a linear system of equations. The system matrices resulting from three-dimensional finite-element analyses are very large and very sparse (i.e. very few nonzero entries). It is not uncommon to have a $10^6 \times 10^6$ matrix for which only 0.0027% of the nodes are nonzeros (e.g., a $100 \times 100 \times 100$ node mesh with a 8-node brick elements). Sparse matrices arise more frequently than dense matrices. A point or node in a system is usually coupled with its neighboring points only, not the entire system. This limited coupling results in sparse matrices.

These matrices are too large to be stored as full matrices. Consequently, compact formats have been developed to store only the nonzero entries. Ideally, the format remains compact throughout execution. Execution is generally performed by a floating point unit (FPU). As is known in the art, the datapath of most large computer architectures consists of two major sections: the integer section and the floating point section. Addresses are generated in the integer section; floating point computations are executed in the floating point sections. Optimal processing requires efficient use of memory and of the FPU.

Iterative solutions for processing sparse matrices are known in the art. Iterative methods are attractive for solving sparse linear systems because they maintain sparsity. The system matrix is used only as an operator to generate new iterates; no matrix modifications or increase in storage occur. In contrast, direct methods can introduce substantial fill-in which limits their utility to average size 2-D and 3-D applications. However, implementing iterative methods is not easy. To maintain sparsity, iterative methods incur the overhead of accessing matrices stored in a compact format that can cause considerable performance loss on conventional architectures.

Typically, compact formats have at least two parts: an auxiliary data structure describing the positions of the matrix entries that are nonzero, and the values of the nonzeros entries. While this reduces storage requirements to $0(N)$ rather than $N^2$ for an $N \times N$ matrix, three types of overhead arise. First, there is high memory bandwidth since the auxiliary data structure must be accessed every time a nonzero entry is accessed. Next, an indirect access system is generally used wherein the auxiliary data structure is used to access another data structure used in the computation. This indirection is sometimes implemented using gather-scatter operations which are expensive and add to the memory bandwidth requirement. Finally, short vector lengths are involved; typically, each row or column has few nonzero values, independent of the matrix size.

For sparse matrix-vector multiplication, which constitutes the computational core of iterative linear solvers, these overheads substantially affect performance. Empirical data indicates that the Cray Y-MP as well as the Intel 80860 processor operate at less than 33% of their peak floating-point rate. Attempts to solve these shortcomings can be divided into three categories: use of direct banded solvers, development of data structures for sparse matrices for use with conventional supercomputers, and special purpose architectures.

Direct banded solvers are widely used by commercial finite element method (FEM) packages. These methods suffice for average size 2-D problems in the range of $10^4$ to $10^5$ equations, but are inefficient, in terms of memory use and computations, for 3-D analyses.

Direct, banded linear solvers are commonly used to solve 2-D FEM problems on supercomputers such as the Cray computers. This is because in addition to being very sparse, FEM matrices are often banded. Computations are executed on all the entries in the band; no-auxiliary data structure is required. It is estimated that the width of the band is approximately $N^{2/3} \times N = N^{5/3}$ entries. In contrast, the original matrix has only approximately $24N$ nonzero entries (using 3-D brick elements). For a $10^5$-node problem, the memory requirement is about 215 Mwords, or about 80 times that required for the nonzero entries in the original matrix.

The storage requirement for direct banded solvers can exceed the available memory in many supercomputers, causing the analyst to compromise accuracy by down scaling the problem. Moreover, the number of computations required for this class of solvers is proportional to $N^{7/3}$ for 3-D applications in contrast to $N^{3/2}$ for iterative solvers. Thus, banded solvers are inadequate for 3-D problems.

Many data structures for the compact representation of sparse matrices have been developed for use on supercomputers. These structures represent the dichotomy that exists with efficient storage of sparse matrices: store only the nonzero entries at the expense of short vector lengths or zero pad the data structure to achieve long vector lengths. Below is a general data structure, sparse matrix K:

$$K = \begin{bmatrix} K_{11} & 0.0 & K_{13} & 0.0 & 0.0 \\ 0.0 & K_{22} & 0.0 & 0.0 & K_{25} \\ K_{31} & 0.0 & K_{33} & 0.0 & K_{35} \\ 0.0 & 0.0 & 0.0 & K_{44} & 0.0 \\ 0.0 & K_{52} & K_{53} & 0.0 & K_{55} \end{bmatrix} \quad (1)$$

Methods for performing the matrix-vector multiplication, $v = Kp$, are provided below. As used herein, N denotes the order of matrix K, and $N_{nz}$ denotes the number of nonzero values in the matrix K.

One conventional data structure known in the art is the Column-Major Nonzero Storage (CMNS) scheme which consists of three one-dimensional vectors. The nonzero values are stored in column-major format in the vector $K_v$; the corresponding row indices are stored in the vector R; and the number of nonzeros per column are stored in the vector, L. The matrix of equation (1) is represented in the following manner:

$K_v^T = [k_{11}, k_{31}, k_{22}, k_{52}, k_{13}, k_{33}, k_{53}, k_{44}, k_{25}, k_{35}, k_{55}]$ $R^T = [1,3,2,5,1,3,5,4,2,3,5]$ $L^T = [2,2,3,1,3]$

This data structure is fairly compact, requiring storage for $N_{nz}$ floating-point values and $N_{nz}+N$ integer values.

Matrix-vector multiplication of matrix K with vector p can be implemented using N vector operations, one per column of $K_v$ as follows:

```
index = 1
for column = 1, ..., N
  for entry = 1, ..., L[column]
    v[R[index]] = v[R[index]] + K_v[index] * p[column]
    index = index + 1
  end for
end for
```

With this approach, floating point unit (FPU) efficiency is compromised because of vector startup overhead and excessive memory bandwidth. The hardware does not exploit any locality of reference between updates required for successive vector computations, resulting in excessive input and output operations.

Another storage scheme known in the art, ITPACK, uses two rectangular arrays, $K_v$ and C. The rows of $K_v$ contain the nonzero entries from the rows of K padded with zeros to insure equal row length. The length of each row is equal to $M = \max\{\text{length}(k_i)\}$ over $i = 1 \ldots N$ where length $(k_i)$ represents the number of nonzero entries in row i of K. C contains the corresponding column indices. For k in equation 1, $K_v$ and C are defined as:

$$K_v = \begin{bmatrix} K_{11} & K_{13} & 0.0 \\ K_{22} & K_{25} & 0.0 \\ K_{31} & K_{33} & K_{35} \\ K_{44} & 0.0 & 0.0 \\ K_{52} & K_{53} & K_{55} \end{bmatrix} \quad C = \begin{bmatrix} 1 & 3 & D \\ 2 & 5 & D \\ 1 & 3 & 5 \\ 4 & D & D \\ 2 & 3 & 5 \end{bmatrix}$$

The D values in C correspond to the zero padding in $K_v$, and can be set to any value between 1 and N. This data structure requires storage for NM floating-point values and NM integer values.

Psuedocode for implementation of matrix-vector multiplication is:

```
for column = 1 .. M
  for entry = 1 .. N
    v[entry] = v[entry] + K_v[column][entry] *
               p[C[column[entry]]
  end for
end for
```

This code entails M vector operations, where each vector has a length equal to N.

FPU operation with this scheme is marginally efficient. Relatively low efficiency is attributable to the large number of computations relating to zero padding (typically, approximately 12–48% of the stored data consists of zero padding) Next, memory reads are required for $K_v$, C, v, and the gathered values of p, and memory writes for v. This large memory bandwidth requirement generally exceeds the available memory bandwidth.

Special purpose architectures have also been utilized to improve the processing of sparse matrices. In particular, an application-specific architecture has been developed at Carnegie Mellon University called the White Dwarf. This architecture exploits matrix symmetry by storing only the upper triangular portion of the matrix. Consequently, the matrix data as well as the multiplier data is accessed indirectly. Good speedup is obtained by using five memory ports and running problems for which all data can fit in main memory.

In sum, while a number of proposals have been made to improve the processing of sparse matrices, there are still a number of shortcomings associated with the prior art. In particular, a high memory bandwidth is involved, expensive indirect accessing techniques are employed, and floating point processing potential is not exploited.

Ideally, solutions to prior art problems will utilize standard components which may be used with existing and future architectures. In particular, the solution should be applicable to general purpose architectures.

OBJECTS AND SUMMARY OF THE INVENTION

It is a general object of the present invention to provide a method and apparatus for optimized processing of sparse matrices.

It is a more particular object of the present invention to provide a new data structure for representing sparse matrices.

It is a related object of the present invention to provide a new computer architecture for efficiently processing sparse matrices.

It is another object of the present invention to more efficiently utilize the computer memory used to store sparse matrices.

It is yet another object of the present invention to provide a method and apparatus for reducing memory bandwidth.

It is another object of the present invention to provide more efficient use of FPU potential during sparse matrix computations.

It is still another object of the present invention to provide an optimized computer architecture for sparse matrix computations, wherein the computer architecture employs standard components which may be used in conjunction with general purpose architectures.

These and other objects are achieved by a computer architecture for processing a sparse matrix. The apparatus stores a value-row vector corresponding to nonzero values of a sparse matrix. Each of the nonzero values is located at a defined row and column position in the matrix. The value-row vector includes a first vector including nonzero values and delimiting characters indicating a transition from one column to another. The value-row vector also includes a second vector which defines row position values in the matrix corresponding to the nonzero values in the first vector and column position values in the matrix corresponding to the column position of the nonzero values in the first vector.

The architecture also includes a circuit for detecting a special character within the value-row vector. Means are also provided for executing matrix-vector multiplication on the value-row vector. This multiplication is performed by multiplying an index value of the first vector value by a column value from a second matrix to form a matrix-vector product which is added to a previous matrix-vector product.

BRIEF DESCRIPTION OF THE DRAWINGS

For a better understanding of the nature and objects of the invention, reference should be had to the following detailed description taken in conjunction with the accompanying drawings, in which.

Like reference numerals refer to corresponding parts throughout the several views of the drawings.

DETAILED DESCRIPTION OF THE INVENTION

Figure 1:
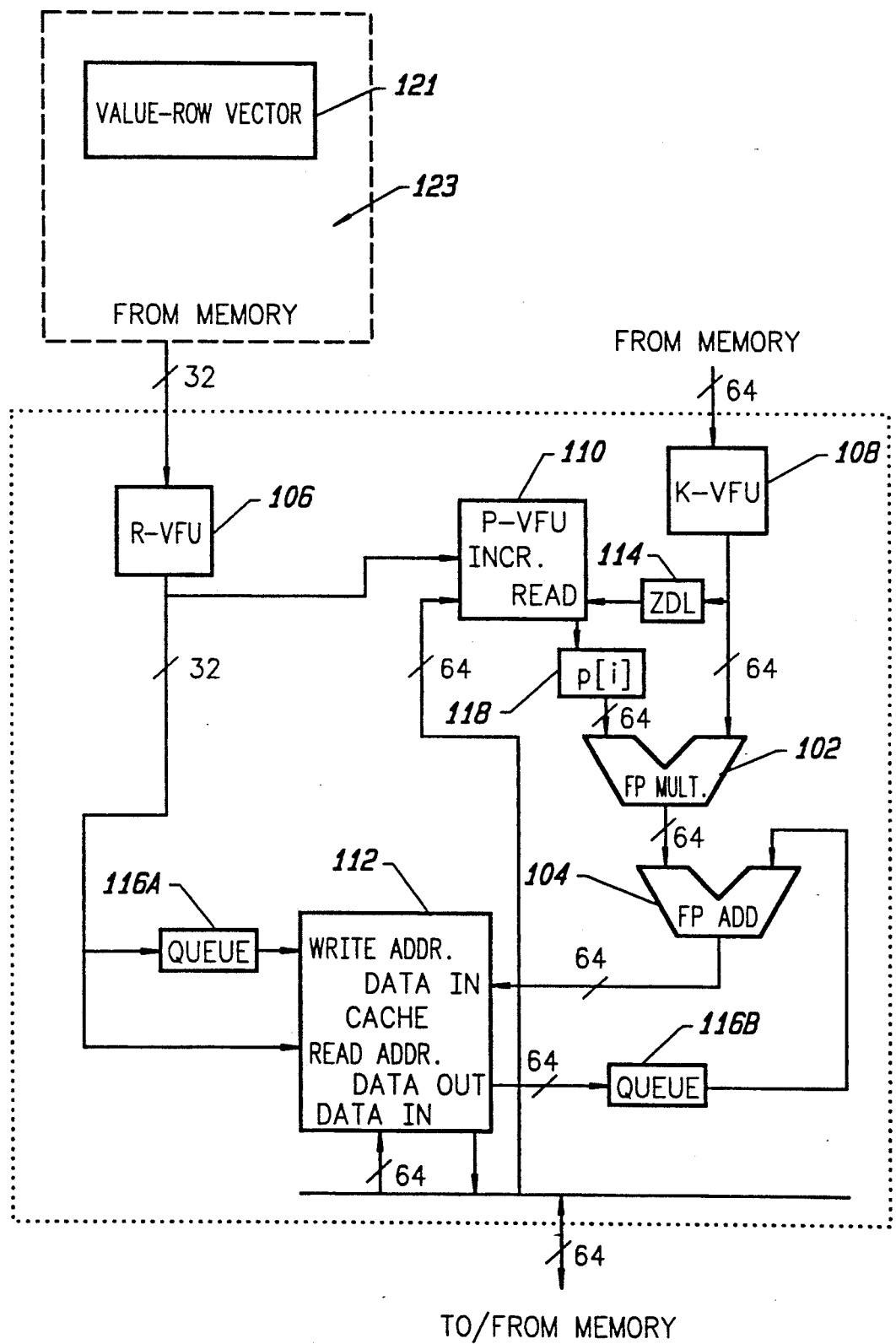
FIG. 1 is a diagram of an apparatus in accordance with the present invention.

The data structure employed in accordance with the present invention is a modification of the Column-Major Nonzero Storage (CMNS) scheme. In particular, zeros are included in $K_v$ to delimit columns, thereby eliminating the need for the vector L. Thus, for the matrix of equation 1, the vectors K and R become:

$$K_v{}^T = [k_{11}, k_{31}, 0.0, k_{22}, k_i{}^2, 0.0, k_{13}, k_{33}, k_{53}, 0.0, k_{44}, 0.0, k_{25}, k_{35}, k_{55}]$$

$$R^T = [1, 3, 1, 2, 5, 1, 1, 3, 5, 1, 4, 1, 2, 3, 5]$$

Each 0.0 entry in $K_v$ denotes the beginning of a new column. The corresponding entry in R, shown in boldface, gives the difference in column numbers between two successive columns of nonzero data. Alternately, the column number itself may be provided. In this example, all of the columns have nonzero values so the offset values are all one. This data structure requires storage for $N_{nz}+N$ floating point values and $N_{nz}+N$ integer values.

Thus, in contrast to the CMNS scheme which includes value ($K_v$), row (R), and column (L) vectors, the present invention merely utilizes value ($K_v$) and row (R) vectors. In contrast to the ITPACK storage scheme which relies upon a value matrix and a column matrix, both of which potentially require excessive zero padding, the present invention utilizes two vectors. The data structure of the present invention is referred to herein as a value-row vector scheme.

Implementation of the matrix-vector multiplication is:

```
column = 1
for index = 1, ..., N_nz + N - 1
    if (K_v[index] = 0.0)
        then column = column + R[index]
        else v[R[index]] = v[R[index]] +
                          K_v[index] * p[column]
end for
```

Matrix-vector multiplication is implemented using only one vector operation. The matrix data is considered one vector stream of data instead of N vector columns of data.

For the one vector operation, memory accesses are required for v, R, and $K_v$. Memory writes are required for the updated values of v. Like CMNS, the values of vector v are accessed indirectly through R and each value of vector p is used for an entire column. In contrast to CMNS, accesses for the vector length are not needed.

The startup overhead occurs only once and is amortized over the long vector of length $N_{nz}+N-1$. The "if" statement is used to detect the start of a new column of K. Because of this statement, the above code cannot be executed efficiently on conventional vector machines since the vector length is not given explicitly. This problem is eliminated with the addition of special zero detection hardware described below.

The data structure of the present invention does not exploit the symmetry of the FEM matrices. However, by storing all the nonzeros in the same manner, all the data are accessed in a regular fashion, therefore prefetching is effective. If only the upper triangular portion of the matrix were stored, access to an entire row (or column) of data would require sequential accesses for the upper triangular segment of the row and indirect accesses for the lower triangular section. For this case, good performance occurs only if all the data is stored in main memory. Indirect accesses to disks significantly degrade performance due to large disk latencies. No locality of reference occurs with the matrix data since it is only used once for matrix-vector multiplication. By storing all the nonzero values, no indirect access occur, only sequential. Therefore, the data can be prefetched to hide the disk latencies.

In sum, the data structure of the present invention realizes a number of advantages. First, there is an efficient use of storage since only nonzero entries with zero-valued column delimiters are stored. Next, there is structured data access, with all the matrix data being stored in one-dimensional data structures and accessed sequentially. Finally, there are minimal startup costs since the startup cost is incurred only once for a vector of maximum length equal to the number of nonzeros in the matrix.

The architecture used in accordance with the invention uses conventional components such as a floating-point adder, a floating-point multiplier, and queues. The nonconventional components consist of the zero detection hardware and a particular cache design. The organization of these components allows for computation on one value-row vector at the execution rate of the floating-point units.

The datapath architecture of the present invention is depicted in FIG. 1. The main components are a floating-point multiplier 102, floating-point adder 104, 3 vector-fetch-units R-VFU 106, K-VFU 108, P-VFU 110, a special cache 112, and dedicated zero-detection logic 114. The floating-point multiplier 102 and floating-point adder 104 are fully pipelined to produce one result every clock cycle. The cache 112 is used to hold the entries of the vector v. The three vector-fetch units 106, 108, 110, are used to hold the data that is accessed sequentially and used only once. Queues 116A and 116B serve as delay units for synchronization.

Given the vector base address and the length, a VFU reads a value-row vector 121 from memory 123 and presents it sequentially on its output. An interleaved memory subsystem is provided (not shown) to achieve the required bandwidth. The vector-fetch units must have adequate internal buffers to do block reads from memory. R-VFU 106 and K-VFU 108 supply one vector element every clock cycle. The P-VFU 110 supplies one element for every column of K, in particular, whenever the zero-detection logic is asserted.

Figure 2:
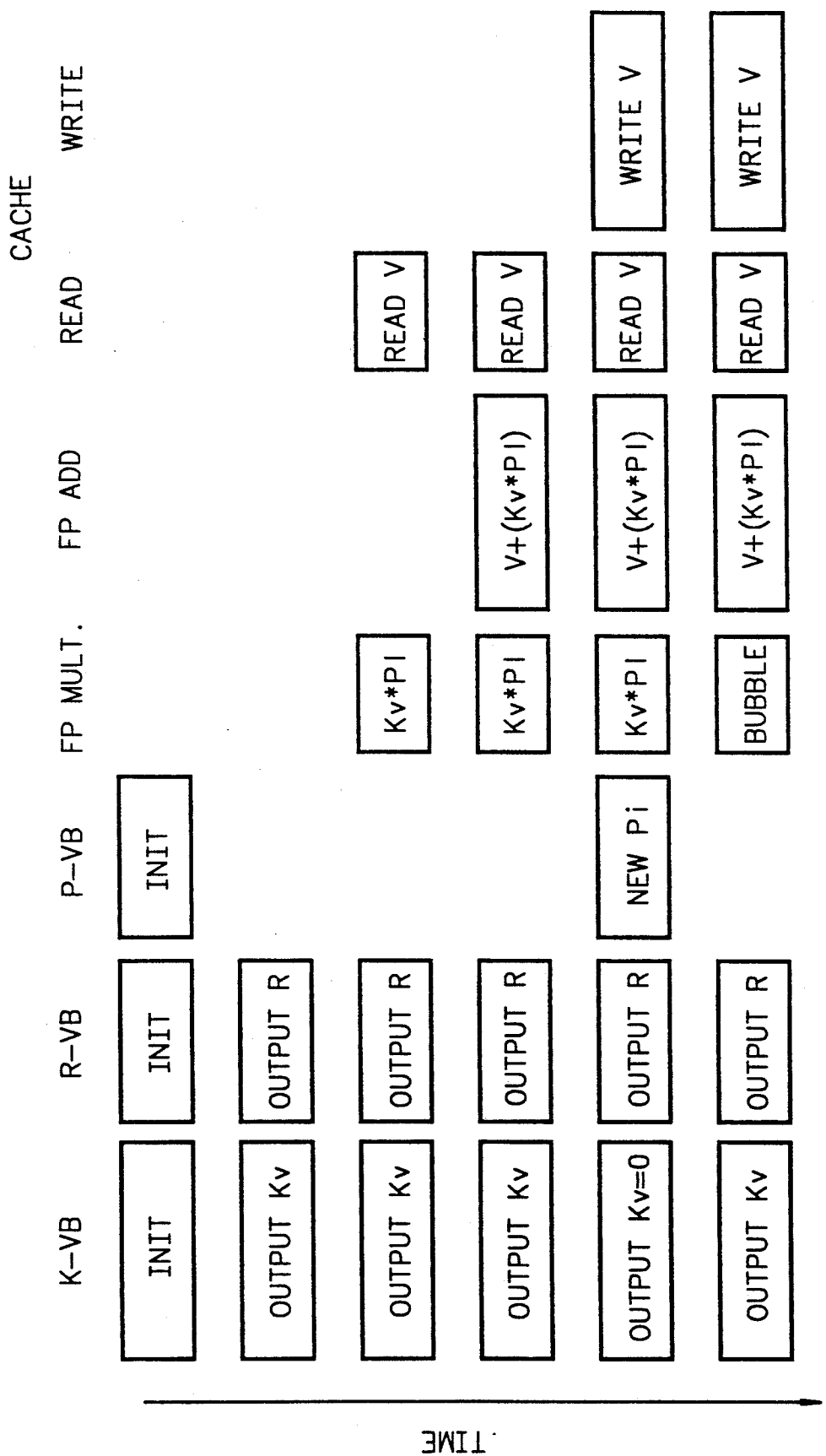
FIG. 2 is a diagram of a sequence of operations executed in accordance with the present invention.

FIG. 2 provides a diagram outlining the sequence of operations consistent with the present invention. Execution begins with an initialization step in which the VFUs 106 and 108 are loaded with the base addresses of the respective vectors. The vectors are then accessed from memory and loaded into the respective VFUs. Only the vectors $K_v$ and R require dedicated memory channels for continuous accesses. For simplicity, FIG. 2 reflects a memory latency of one. Subsequently, the K-VFU 108 supplies the floating point multiplier with the non-zero entries of K. Each column of K is multiplied by the same entry of p, which is held in latch 118. The product generated by the multiplier is added to the appropriate entry of v, determined by the index supplied by the R-VFU 106. The output of the K-VFU 108 is also fed to the zero-detection logic 114 which signals the beginning of a new column of K when a zero is detected, and causes the next entry of p to be loaded in to the latch 118. This results in one pipeline bubble per column of K. This logic, however, enables the data in the proposed data structure to be accessed as one vector; no conditional statements are needed.

The zero-detection logic detects zero values in the K-VFU data stream. In most conventional computers, zero detection is executed in the floating-point unit (FPU) using a conditional instruction. Zero-detection needs to be executed in one clock cycle with the present invention to insure the use of the correct multiplier from p (latch 118). Therefore, special hardware, more fully described below, is used to detect zero values in the matrix data, $K_v$.

The R-VFU 106, operating in parallel with the K-VFU 108, supplies the row indices of the non-zero entries of K to the cache 112. These indices determine which entry of vector v to update; no explicit address generation for the entry of v is required. The cache reads out the appropriate entries of v to the adder using the indices as addresses. The update for each entry, however, is not available immediately, but only after a delay corresponding to the depth of the pipelined adder. For this reason, the indices are also sent to 116A to be used as cache write addresses. The length of the queue is equal to the adder pipeline depth.

A second queue 116B is used at the input to the adder to synchronize the arrival of the elements of the products generated by the multiplier. Assuming that the K-VFU 108 and the R-VFU 106 start supplying data in the same clock cycle, the size of the delay must equal the pipeline depth of the multiplier. For the prefetching scheme discussed below, the delay will be longer.

A pipeline hazard is something in the design and use of a pipeline that prevents it from accepting data at the maximum rate. The pipeline of the present invention takes one of its inputs from vector v (stored in cache) as well as returns the output to v. A hazard can occur with this pipeline if the desired input form vector v is not available in the cache because it is still going through the adder pipeline. This hazard is known as a read-after-write hazard because the operand read operation is stalled until the particular write operation is complete. The necessity of stalling the operand read prevents the adder pipeline from operating at maximum rate.

Relying upon the matrix of equation 1 and the vector equation of the present invention, it can be appreciated that a distance of 4 cycles exists between the first two updates to v5, depicted by the vector R in the vector equation. A read-after-write hazard occurs with v5 if the adder pipeline depth is greater than 4. In general, this hazard occurs only if the depth of the adder pipeline is more than the number of cycles between successive updates to the same element of v.

The hazard can be avoided by using a preprocessing step that consists of manipulating the locations of the nonzero entries in a column to allow ample clock cycles between successive updates to the same entry of v across columns.

Figure 3:
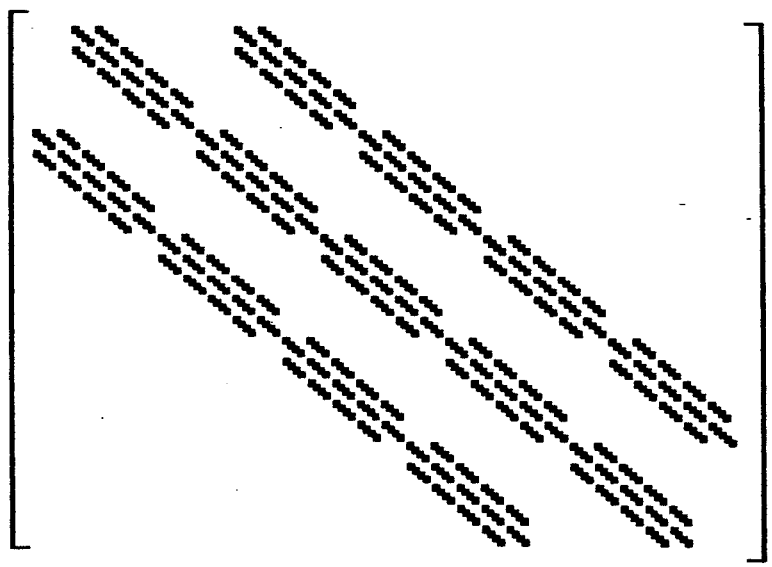
FIG. 3 is a depiction of a sparsity pattern of a large matrix resulting from a three-dimensional finite element method.

Cache 112 is used to hold v. This vector is not accessed sequentially, though with typical node numbering schemes has substantial spatial-temporal locality. As an example, consider the sparsity pattern of a 125×125 matrix given in FIG. 3. Temporal locality results because the nonzero entries in a given row are clustered over adjacent columns. Spatial locality results because the non-zero entries in a given column are clustered over adjacent rows. In general, the banded characteristic of the matrix translates to locality of reference for v.

The cache of the present invention is similar to prior art caches, but includes optimizations to improve cache writes. The write operation in conventional caches typically requires two clock cycles: one cycle to read and check the tag and then a second cycle to perform the write operation. In the present invention, these two operations are pipelined to produce an effective one-cycle write. Also, as described below, a write-back technique is used to decrease memory bandwidth usage. Preferably, each block or cache line consists of a tag, 64-bit data entry (for double-precision computations), a valid-bit, and a dirty-bit.

The output of the R-VFU 106 is used as cache address. This is sufficient if only one user is running an entire program at any time. However, for the case when multiple users are sharing the hardware, data from different data sets can reside in the cache. To avoid having to flush (or invalidate) the cache prior to each user accessing the hardware, unique addresses should be used for the cache data. The unique address can be generated by adding the row indices to the base address of the row vector. This requires the use of a fully-pipelined integer adder for which the input are the output of R-VFU 106 and the base address and the output is the cache address.

A cache write requires additional clock cycles beyond the tag comparison to perform the write operation. Modifications to the block cannot begin until after the tag has been checked. In contrast, a read instruction reads the data block at the same time the tag is read and compared. If the read is a hit (tags match and valid bit is set), the data is immediately passed on to the CPU (not shown) or the FPUs. Preferably, the target computations use equal number of reads and writes, therefore it is crucial that the cache write operation executes in one cycle.

A one-cycle write operation may be obtained by using a two-stage pipeline. Since tags and data are generally implemented as two different memories, these fields can be addressed independently. The write pipeline consists of two stages: stage one compares the tags, and stage two performs the write operation for a write hit (the tags match). The cache write from the previous write operation and the tag comparison for the current write operation are performed in parallel. Thus, the writes can be performed in succession at the rate of one per clock cycle.

Preferably, a write-back write policy is employed. In this scheme, a write operation to a location that is already in the cache is written to the cache, but is not immediately written to second-level memory, i.e., a second-level cache or main memory. The write-back scheme is advantageous because of the decrease in memory traffic in comparison to updating the memory as well as the cache for every write operation. In addition, writes occur at the speed of the cache, not the memory.

Rarely is the write location not in the cache, since the modified data was just read from the cache as input for the FP adder only a few cycles prior to the write operation. However, when this rare event occurs, the modified data is written to the cache but not immediately to memory. The data that has been written to cache but not to memory has the dirty bit set to one. Therefore, when the cache's block replacement algorithm selects this block for replacement and the dirty bit is set, the modified data is written back to memory.

Cache misses may be eliminated by prefetching vector v. In the dataflow sequences previously described, it was assumed that elements of $K_v$ and the corresponding elements of R were fetched in parallel. By fetching the element of R earlier than $K_v$, vector v can be prefetched to insure the availability of the needed entries of v. The decoupling of $K_v$ and R allows the values in R to be accessed ahead of $K_v$. The maximum cache efficiency is obtained by using a queue 116a for which the number of clock cycles that R is fetched ahead of $K_v$ is equal to the cache miss penalty (i.e., the number of cycles required to fetch vector entries not in the cache) minus the pipeline depth of the multiplier. The effective result is a pre-cache miss rate of 0% or 100% cache hit rate.

Figure 4:
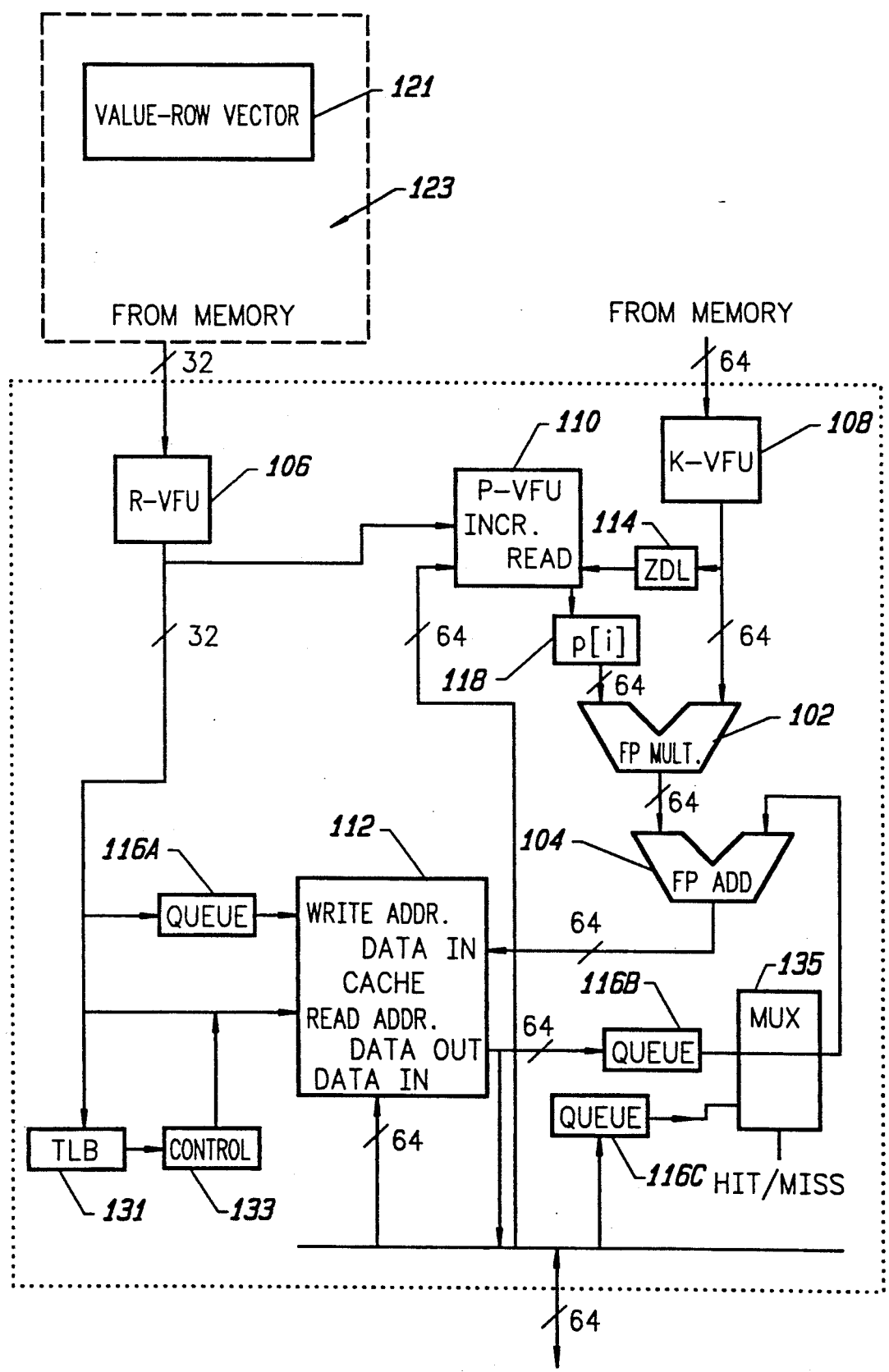
FIG. 4 is a modified apparatus corresponding to FIG. 1 which may be used for prefetching values.

The prefetching of vector v requires the use of two queues to hold the added values for the floating-point adder. FIG. 4 depicts a modified embodiment corresponding to FIG. 1. One queue 116B holds the values of vector v that are available in the cache and another queue 116C holds the values of vector v that need to be accessed from main memory (or second level cache). A corresponding bit vector representing a hit (1) or miss (0) is used to switch between the two queues for the values of v to be used as input to the FP adder.

The prefetching of vector v can be considered a pipeline that handles cache misses. Thus, read-after-write hazards must be avoided. This hazard occurs when $v_i$ is not in the cache, an address is sent to main memory to obtain $v_i$, and then a second attempt is made to read $v_i$ occurs before the first $v_i$ is returned from main memory. This scenario results in the second miss of $v_i$ being sent to memory to obtain the obsolete value instead of the updated value returned to the cache.

This hazard is avoided by using a fast small memory or a translation lookaside buffer (TLB) 131 to store the row indices or addresses of the $v_i$'s that are not in the cache thereby requiring a read from second level memory. The size of the TLB is equal to the miss penalty which is generally in the range of 10. When a miss cache occurs, the TLB 131 is checked first. If the row index or address is in the TLB 131 (because the data is being fetched from memory) this address is sent by a controller 133 to a delay unit or queue to be used to address the cache after the updated value has been written into the cache. Otherwise, the address is sent to main memory to obtain the needed value. Data is selected for the adder 104 by a multiplexer 135

In addition to unique cache design and prefetching, the present invention employs novel zero detection logic. The zero detection logic unit (ZDL) 114 detects a zero in the $K_v$ data stream and serves as the read signal for the P-VFU 110. When a zero is detected, a new value from P-VFU 110 is placed in latch 118. The IEEE 754-1985 standard represents a zero value with the exponent and mantissa fields equal to zero. Therefore, the input to the ZDL 114 consists of the mantissa and exponent of the double-precision, floating-point value from K-VFU 108; the ZDL 114 input is 63 bits wide. In one clock cycle, the ZDL must detect when all 63 bits are zero to insure the correct multiplier for the nonzero data.

Figure 5:
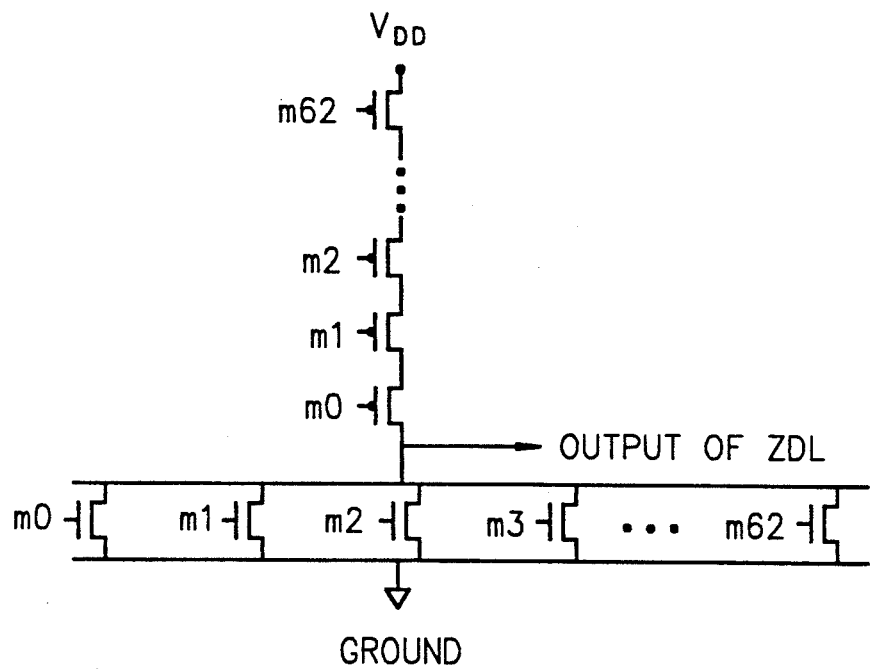
FIG. 5 discloses zero detection hardware which may be used in accordance with the present invention.

FIG. 5 depicts a CMOS implementation of the ZDL 114 with a NOR gate (the m's correspond to the mantissa bits). The performance of the ZDL is dictated by and inversely proportional to the rise time of the logic. NOR gates are used to detect when all the inputs are zero. A 63-input NOR gate implemented in CMOS requires a large rise time because of the series transistors connected to VDD as illustrated in FIG. 5. The series transistors must all be charged prior to charging the output. Therefore, the rise time is either linearly or exponentially proportional to the number of series transistors. The factor of proportionality is determined by the ratio of the capacitance of a unit drain area to the other load capacitance on the gate routing and fan-out.

Figure 6:
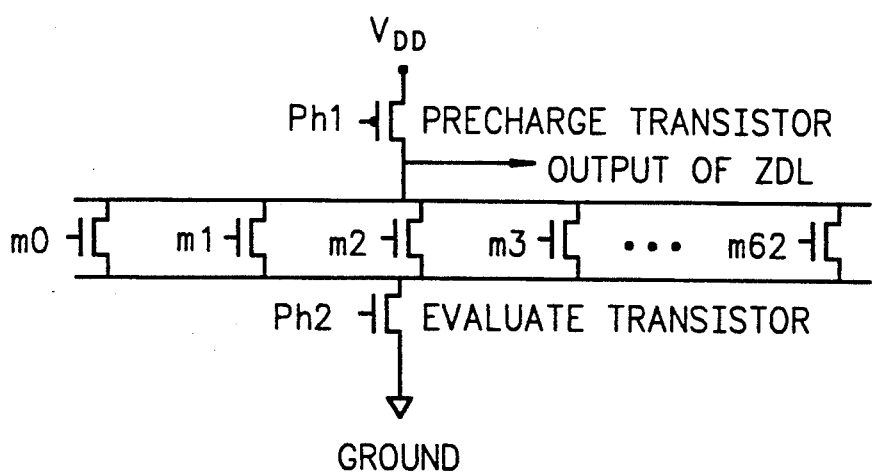
FIG. 6 depicts alternate zero detection hardware which may be used in accordance with the present invention.

One solution to this problem is multi-stage logic, consisting of gates with few inputs. This solution, however, requires multiple clock cycles determined by the number of logic stages. A more appropriate alternative is a dynamic CMOS implementation as illustrated in FIG. 6. The series transistors are replaced by a precharge p-transistor. Dynamic logic uses the two phases of the clock. The precharge occurs during one phase of the clock and the evaluation occurs during the complementary phase. During the precharge phase, the output is charged to a one. The input to the n-transistors change only during this phase to insure signal stability during the evaluation phase. During the evaluation phase, the output is discharged to ground if at least one of the mantissa bits is one, corresponding to a non-zero $K_v$ value. Since the precharge and evaluate operations occur during complimentary phases of each clock cycle, the ZDL is executed in one clock cycle using dynamic CMOS. As will be appreciated by one skilled in the art, instead of relying upon detection of a zero, any special character and corresponding circuitry may be utilized in accordance with the invention.

Having described the data structure and architecture of the present invention, attention turns to its performance. Once the pipeline is filled, results are obtained every clock cycle except for the potential pipeline stalls mentioned above. Ignoring stalls, the total execution time in clock cycles is:

$$T_{total} = T_{startup} + N_{nz}(1 + m \cdot t_{miss}) + N$$

where Tstartup is the initial startup time needed to fill the floating-point pipelines, $N_{nz}$ is the number of nonzeros in K, m is the cache miss rate, $t_{miss}$ is the cache miss penalty, and N is the size of the matrix. The N clock cycles are necessary because of the zeroes included in $K_v$ to delimit columns. The use of cache prefetching results in the cache miss rate being zero. Therefore, the total time for the proposed architecture becomes:

$$T_{total} = T_{startup} + N_{nz} + N$$

One hundred percent utilization of the FPUs would require the following number of clock cycles:

$$T_{100\% util} = N_{nz}$$

The FPU utilization is equal to the ratio of $T_{100\% util}$ k to $T_{total}$:

$$N_{nz}/(T_{startup} + N_{nz} + N)$$

Assuming a large number of nodes in the range of $10^6$, the above approximates to $$N_{nz}/(N_{nz} + N)$$

Using the empirical average of 24 nonzeros per column for a 3-D finite-element applications, $N_{nz} = 24N$. The utilization reduces to $24/25 = 96\%$.

Thus, unlike the prior art, extremely high FPU utilization results. Those skilled in the art will appreciate the other advantages associated with the present invention. Namely, storage is used more efficiently with the present invention since only nonzero entries with zero-values column delimiters are stored. The present invention also has structured data access such that all the matrix data is stored in one-dimensional data structures and accessed with a stride of one. The startup cost associated with the present invention is minimal since it is only incurred once for a vector of maximum length equal to the number of nonzeros in the matrix. Yet another advantage associated with the invention is that the row values can be accessed ahead of the nonzero values to prefetch the resultant vector data, thereby eliminating the effects of the cache misses.

The architecture involves a simple data path design that can be easily incorporated into general purpose architectures resulting in a good performance to cost ratio. The architecture combines vector processing with the use of cache. The cache exploits the locality of reference of the resultant vector. Memory bandwidth requirements are decreased since the majority of the time the data is in the cache. If the cache data is prefetched, the cache miss rate is effectively nonexistent. Finally, a 96% utilization of the FPU in a 3-dimensional problem is possible.

One skilled in the art will recognize many feasible implementations of the present invention. By way of example and not limitation, two different implementations are provided herein.

Figure 7:
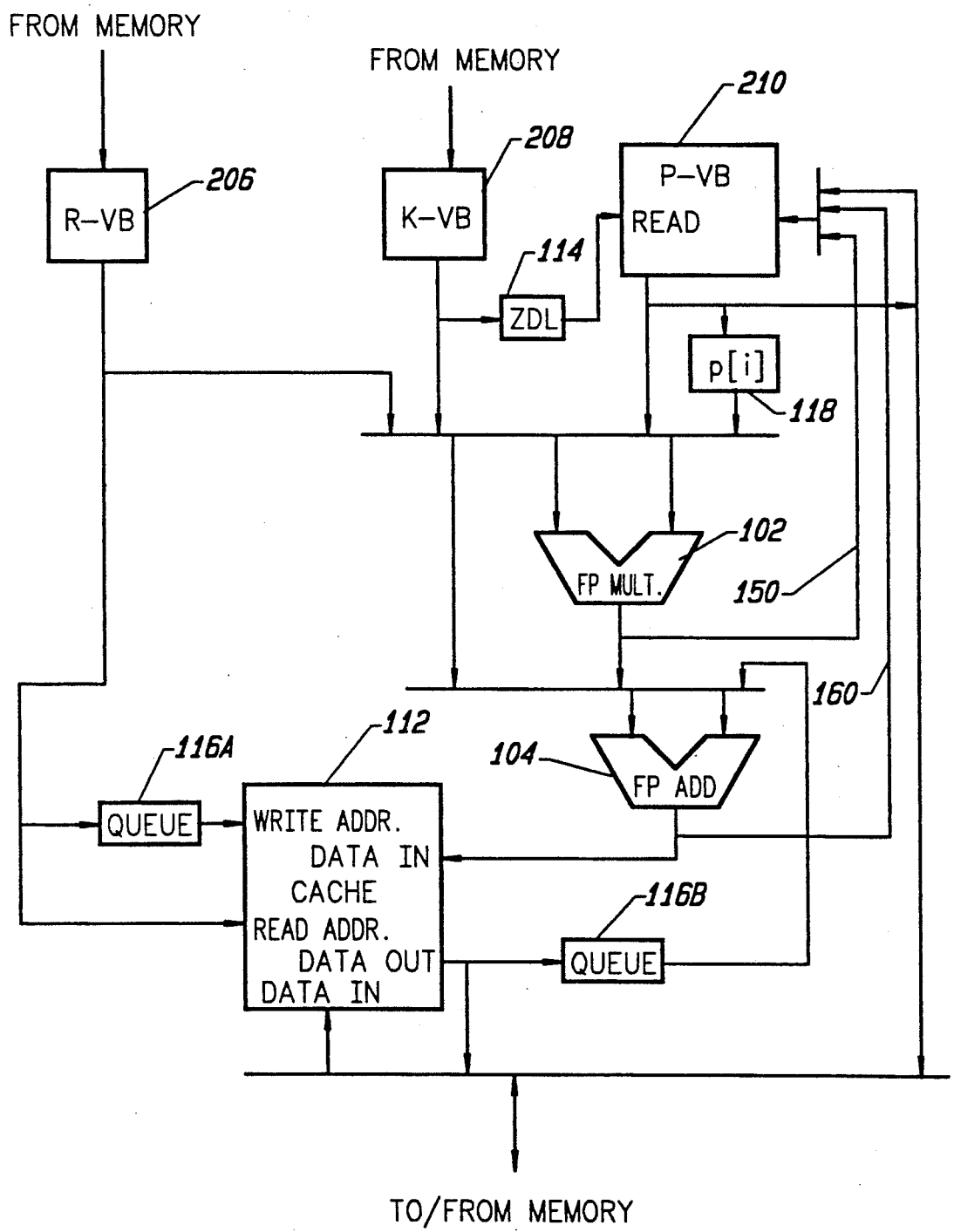
FIG. 7 is a diagram of hardware components for a coprocessor incorporating the teachings of the present invention.

One possible implementation of the present invention is as a coprocessor as depicted in FIG. 7. By way of overview, the coprocessor implementation consists of the disclosed architecture with additional datapaths for operations such as vector addition. This coprocessor could then be added to an existing computer to perform both dense and sparse computations.

As seen in FIG. 7, additional data paths 150 and 160 allow for other vector operations such as addition of two vectors. The inputs to the FPUs can come from the R-VB 206, K-VB 208, and P-VB 210. The outputs of the FPUs can go to the P-VB 210 for dense vectors or the cache 112 for sparse vectors. The P-VB 210 and the cache 112 are connected to the bidirectional memory port. The R-VB 206 and K-VB 208 only read from memory.

The instruction set for this embodiment consists of conventional vector instructions, similar to those used with the Cray architectures, with the addition of two instructions used for sparse matrix computations. One additional instruction is: $V_t$ $V_k$ *z P. This instruction multiplies the values in the vector buffer (or registers), $V_k$, by the scalar value in the P-latch 118, and places the results in $V_t$. The subscript Z implies the use of the values in $V_k$ as inputs to the zero detection logic. This instruction allows the data to go to the zero detection logic so that a matrix can be accessed as one vector.

The other additional instruction is: C(R) C(R)+V. This instruction adds the values in the vector buffer, $V_t$, to the values obtained from the cache addressed through the R vector buffer, and places the results back in the cache addressed through a delayed R. This instruction eliminates the excessive memory bandwidth of gather-scatter operations.

Figure 8:
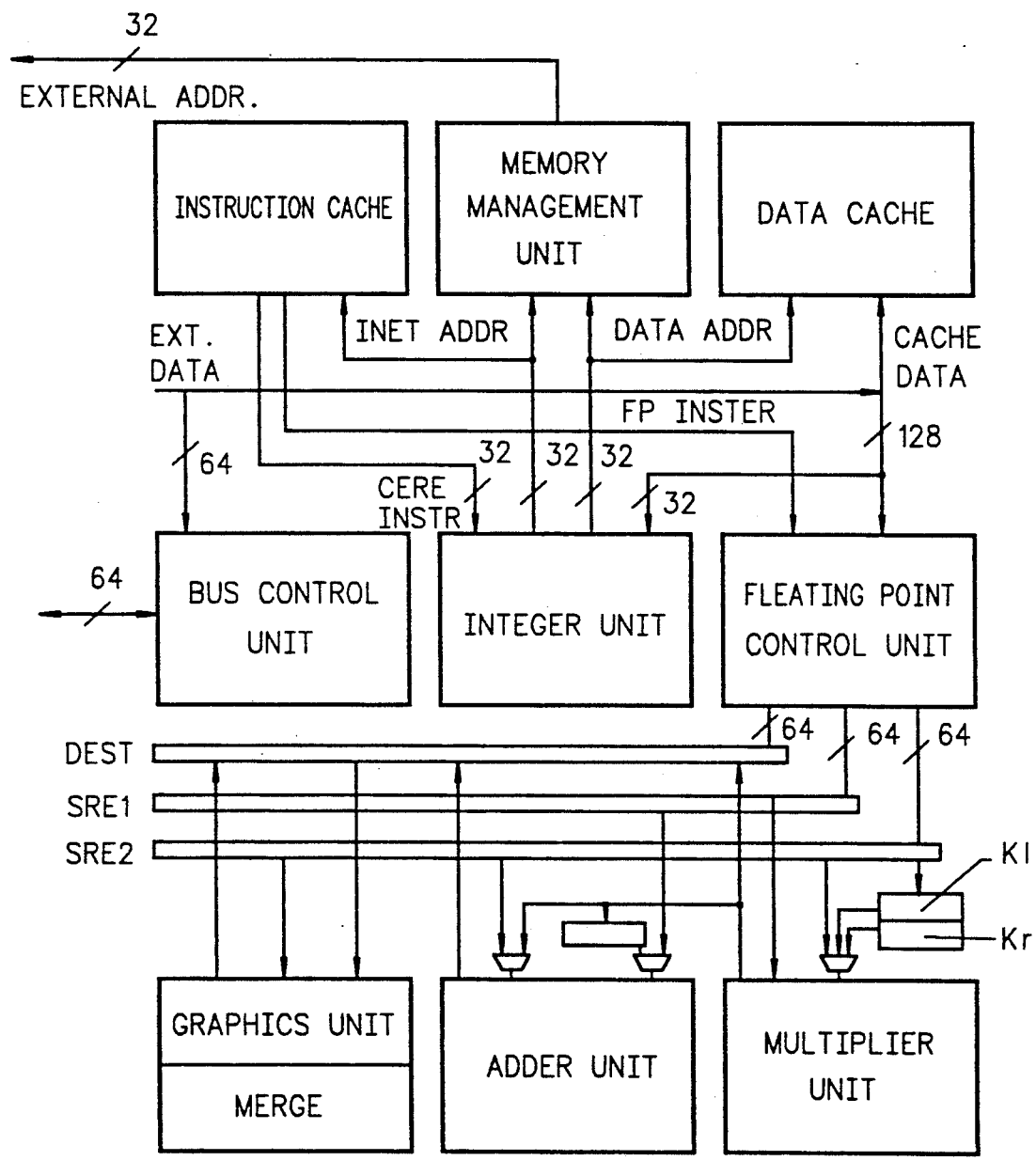
FIG. 8 is a block diagram of an Intel 80860 processor which may be used in accordance with the present invention.

Another possible implementation of the present invention would be into the architecture of an existing chip. For instance, the present invention may be utilized in accordance with the Intel 80860 processor. FIG. 8 is a block diagram of the Intel 80860 processor. The required modifications to incorporate the datapath of the present invention would be as follows. First, the zero detection logic 114 (FIG. 1) would be added. Next, the integer and FP registers of the Intel chip would be enabled to be used as vector buffers and the data cache would not be used for dense vector operations. Additional FP registers would be provided for the P-VB 210 (FIG. 7) and queues 116A, 116B. The 128-bit wide bidirectional cache bus would be separated into two 64-bit wide buses, one for reading data and one for writing data. An additional cache address bus would be added to allow cache reads and writes to occur simultaneously. Finally, the two stage pipeline would be incorporated for the cache writes.

The above modifications can be incorporated into the Intel 80860 processor by allowing for a larger chip area or using smaller technology or a combination of the two. In addition, a larger package is required. The instruction set for the enhanced processor would consist of the Intel 80860 instruction set with the addition of the two instructions previously discussed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A computer architecture for processing a sparse matrix, comprising:
   a memory that stores a value-row vector corresponding to nonzero values of said sparse matrix, where each of said nonzero values is located at a defined row and column position in said sparse matrix, said value-row vector including
   a first vector including nonzero values of said sparse matrix and delimiting characters indicating a transition from one of said columns to another of said columns, and
   a second vector defining row position values of said sparse matrix corresponding to said nonzero values in said first vector and column position values in said sparse matrix corresponding to the column position of said nonzero values in said first vector;
   a circuit, coupled to said memory, to detect said delimiting characters within said value-row vector; and
   a multiplier, coupled to said memory and sad circuit, to execute matrix-vector multiplication on said value-row vector from said memory.

2. The apparatus of claim 1 wherein said multiplier performs said matrix-vector multiplication by multiplying an indexed value of said first vector value by a column value from a second matrix to form a matrix-vector product which is added to a previous matrix-vector product.

3. A computer architecture for processing a sparse matrix comprising:
   means for storing a value-row vector corresponding to nonzero values of said sparse matrix composed of a plurality of columns and rows;
   a first vector fetch unit for receiving from said storing means row values and column values from said value-row vector;
   a second vector fetch unit for receiving from said storing means a matrix value from said value-row vector;
   a special character detection device, coupled to said second vector fetch unit, for detecting a special character in said matrix value;
   a latch coupled to said first vector fetch unit for receiving a column value from said first vector fetch unit and for latching a corresponding latched vector element of a first defined vector;
   a floating point multiplier, coupled to said latch and said second vector fetch unit, for multiplying said matrix value from said second vector fetch unit with said latched vector element to form a multiplier product;
   a cache storing at least a portion of a second defined vector and outputing an element of said second defined vector corresponding to a row value from said first vector; and
   a floating point adder for adding said multiplier product and said second vector element output by said cache.

4. The apparatus of claim 3 wherein said value-row vector includes
   a K vector including said value and delimiting characters indicating a transition from one of said columns to another of said columns; and
   an R vector defining said row value and column difference values corresponding to the difference between two of said columns which include said nonzero data.

5. The apparatus of claim 4 wherein said special character detection device is a CMOS zero detection circuit.

6. The apparatus of claim 4 wherein said cache utilizes a pipelined one-cycle write.

7. The apparatus of claim 6 wherein said cache receives a cache line including a tag, multi-bit data, a valid-bit, and a dirty-bit.

8. The apparatus of claim 7 wherein said pipelined one-cycle write includes a first stage to compare a first tag of a first cache line to a second tag of a second cache line and a second stage to perform a write operation when said first tag and said second tag match.

9. The apparatus of claim 8 wherein said write operation is to cache alone and not to a secondary memory.

10. The apparatus of claim 9 further comprising: means for prefetching said R vector.

11. The apparatus of claim 10 wherein said prefetching means includes:
    memory means coupled to said first vector fetch unit for storing addresses to be used if a cache miss occurs;
    a controller coupled to said memory means and said cache;
    a hit queue coupled to said memory;
    a miss queue coupled to a primary memory; and
    a multiplexer with inputs coupled to said hit queue and said miss queue and an output coupled to said floating point adder.

12. The apparatus of claim 4, wherein said apparatus is utilized as a coprocessor.

13. The apparatus of claim 3 further comprising an indexing circuit that determines the row and column position of each sparse matrix value being multiplied by said multiplier, and fetches and supplies to said multiplier a corresponding multiplicand.

14. A computer architecture for processing a sparse matrix, comprising:
    a memory for storing a value-row vector corresponding to nonzero values of said sparse matrix, where each of said nonzero values is located at a defined row and column position in said sparse matrix, said value-row vector including
    a first vector containing first vector values including nonzero values of said sparse matrix and special characters indicating a transition from one of said columns to another of said columns, and
    a second vector containing second vector values defining row position values of said sparse matrix corresponding to said nonzero values in said first vector and column position values in said sparse matrix corresponding to the column position of said nonzero values in said first vector;
    a floating point multiplier, coupled to said memory, for multiplying said nonzero values of said sparse matrix by an indexed column element value to produce a multiplier vector product; and
    a floating point adder, coupled to said floating point multiplier, for adding said multiplier vector product with a sum of prior multiplier vector products.

15. The apparatus of claim 14 further comprising:

a first vector fetch unit, coupled to said memory, to obtain said first vector values; and a second vector fetch unit, coupled to said memory, to obtain said second vector values.

16. The apparatus of claim 15 further comprising:

a symbol identification circuit coupled to said first vector fetch unit to identify said special characters.

17. The apparatus of claim 16 further comprising:

a latch coupled to said second vector fetch unit to receive said column position values from said second vector values, and for latching said indexed column element value into said multiplier.

18. The apparatus of claim 17 further comprising:

a cache, coupled to said multiplier, for storing said prior multiplier vector products.

19. The apparatus of claim 16 wherein said symbol identification circuit is a zero detection circuit.

* * * * *